(12) United States Patent
Mizell et al.

(10) Patent No.: US 7,230,951 B2
(45) Date of Patent: Jun. 12, 2007

(54) POLICY BASED MOBILE IP

(75) Inventors: Jerry Mizell, Plano, TX (US); David J Lauson, McKinney, TX (US); Peter Wenzel, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 994 days.

(21) Appl. No.: 10/417,437

(22) Filed: Apr. 16, 2003

(65) Prior Publication Data

US 2004/0208153 A1 Oct. 21, 2004

(51) Int. Cl.
*H04L 12/28* (2006.01)
(52) U.S. Cl. .................. 370/401; 370/392; 455/433
(58) Field of Classification Search ............... None
See application file for complete search history.

(56) References Cited

U.S. PATENT DOCUMENTS

2002/0069278 A1* 6/2002 Forslow ................. 709/225
2002/0080752 A1* 6/2002 Johansson et al. .......... 370/338
2002/0188562 A1* 12/2002 Igarashi et al. ............... 705/40
2004/0047348 A1* 3/2004 O'Neill .................... 370/389
2004/0085931 A1* 5/2004 Rezaiifar ................... 370/331

* cited by examiner

*Primary Examiner*—Duc Ho
(74) *Attorney, Agent, or Firm*—Garlick Harrison & Markison; James A. Harrison

(57) ABSTRACT

A foreign agent routes data packets according to policy based routing information maintained by the home network. The policy may be network based or may be subscriber profile based as defined in an authentication, authorization, and accounting server. The policy routes data packets according to one of an address specified in the mobile IP header and an application type. The address specified in the mobile IP header is typically within a range of addresses within the home network. The foreign agent routes data packets of the specified policy type directly to the home agent server. Data packets that are not of the specified policy type are routed directly to an Internet access point.

19 Claims, 8 Drawing Sheets

Communication network

POLICY BASED MOBILE IP

BACKGROUND

1. Field of the Invention

The present invention relates to mobile communication devices and, more particularly, the present invention relates to mobile terminals communicating in a mobile IP network.

2. Related Art

The Internet, as we know it today, began as a joint project between the Department of Defense's (DoD's) Advanced Research Project Agency (ARPA) and the United Kingdom's National Physics Lab (NPL) during the height of the Cold War. When planning started in 1967, the project was conceived to distribute communications and data through a dispersed network of highly interconnected network nodes with high redundancy. A decision was made, based on research at the NPL, to move data through the network using a technique called "message switching", or packet switching as it is called today. In order to exchange data, each node was assigned a unique address in relation to the addresses assigned to all other nodes. The address scheme devised was a 32-bit number comprising a network part and a host (network node) part. By 1971, 15 nodes, mostly at universities, were connected to the ARPA network (ARPANET). They were linked for time sharing to support a variety of remote terminals and allowed data transfers between distant computers.

The early 1970s produced a number of products that would effect the development of the ARPANET. The Palo Alto Research Center (PARC), funded by Xerox Corporation, developed a graphical user interface (GUI), a computer pointing device called a mouse, and most importantly, an Ethernet protocol, for inter-connecting computers that allowed users to send and receive electronic mail and share files.

At the same time that ARPANET was being develop for institutional use, the first personal computer was introduced by Altair in 1975. Sold as a kit, it was an instant success with computer enthusiast but its sales were limited due to the technical skill required to assemble the kit. It did, however, confirm that a market existed for a personal computer. Thus, in 1981, International Business Machines (IBM) introduced the Personal Computer (PC) which became the defacto industry standard. The IBM PC was an open architecture machine, meaning IBM published all technical details of the PC. This fact allowed low cost providers to produce PC "clones" so consumers were able to purchase personal computers at affordable prices. Low cost dial-up modems allowed PC users to download files from bulletin boards.

By the late 1980s, the ARPANET was almost 20 years old. The DoD split the ARPANET into two distinct parts for specific uses. One part was reserved for military sites (known as MILNET), while the ARPANET was for civilian use. Management of the ARPANET was turned over to the National Science Foundation (NSF) with NSF regional networks forming the backbone of the re-named Internet. Commercial Internet service providers (ISP) began offering Internet access points (AP) through which large numbers of PC users began accessing the Internet: These PCs were desktop machines whose location was not likely to change, thus creating a home network for ISP.

As technology evolved, smaller, more powerful laptop PCs became available. Their size released them from the desktop and the office. Sales, marketing, and technical personnel could take the laptop PCs on the road while maintaining contact with the office through remote applications such as e-mail and file transfers. These laptop PCs created mobile users that wanted to access the Internet while moving between networks, thereby causing a transition from a centralized system to a distributed system. Advances in wireless technology made wireless networking possible. Using a mobile IP protocol, laptop PCs, personal digital assistants (PDA) and mobile phones equipped for web browsing could access the Internet. Using either a static or dynamic mobile IP address assigned by their home networks, these mobile users or mobile terminals accessed the Internet from any available Internet access point.

When a mobile terminal changes its access point from its home network to a foreign network, it does not change its mobile IP address. Home agents (HA) are special servers responsible for routing data packets to absent mobile terminals. The HA is informed of the absent mobile terminal's location when the mobile terminal registers with the foreign network. The server on the foreign network, the foreign agent (FA), provides its IP address (care-of address) to the HA during mobile terminal registration. After registration, the FA is responsible for routing data packets between the mobile terminal and home network via the HA. A problem exists, however, in that not all data packets are destined for the home network. For example, data packets destined for a web server are routed to the HA causing the HA to forward them to the web server. A response from the web server is routed back to the HA which must then forward the data packets back to the FA. This routing and re-routing of data packets requires the home network provider to provision equipment and resources for network traffic that is not explicitly intended for the home network.

Accordingly, there is a need in a wireless data network for a method and apparatus to intelligently route mobile terminal data packets in a manner that is more efficient in terms of resource requirements and that reduces unnecessary network traffic.

SUMMARY OF THE INVENTION

A method and apparatus in accordance with the present invention supports the routing of mobile terminal data packets according to a routing policy defined by a mobile terminal's home network. A foreign agent registers the mobile terminal as defined by mobile IP protocol. The foreign agent uses the routing policy received during registration to route data packets according to one of an application type and a destination address. The routing policy may additionally include subscriber based routing policies. Based on the application type and destination address contained in the data packet, the foreign agent will route the data packet to the home network through a mobile IP tunnel or to an Internet AP for delivery to a web server.

The mobile terminal is one of a data packet service type including a general radio packet services terminal, a 1×EV-DO terminal, a 1×EV-DV terminal, a 1×RTT terminal, and a Wireless Local Area Network terminal.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
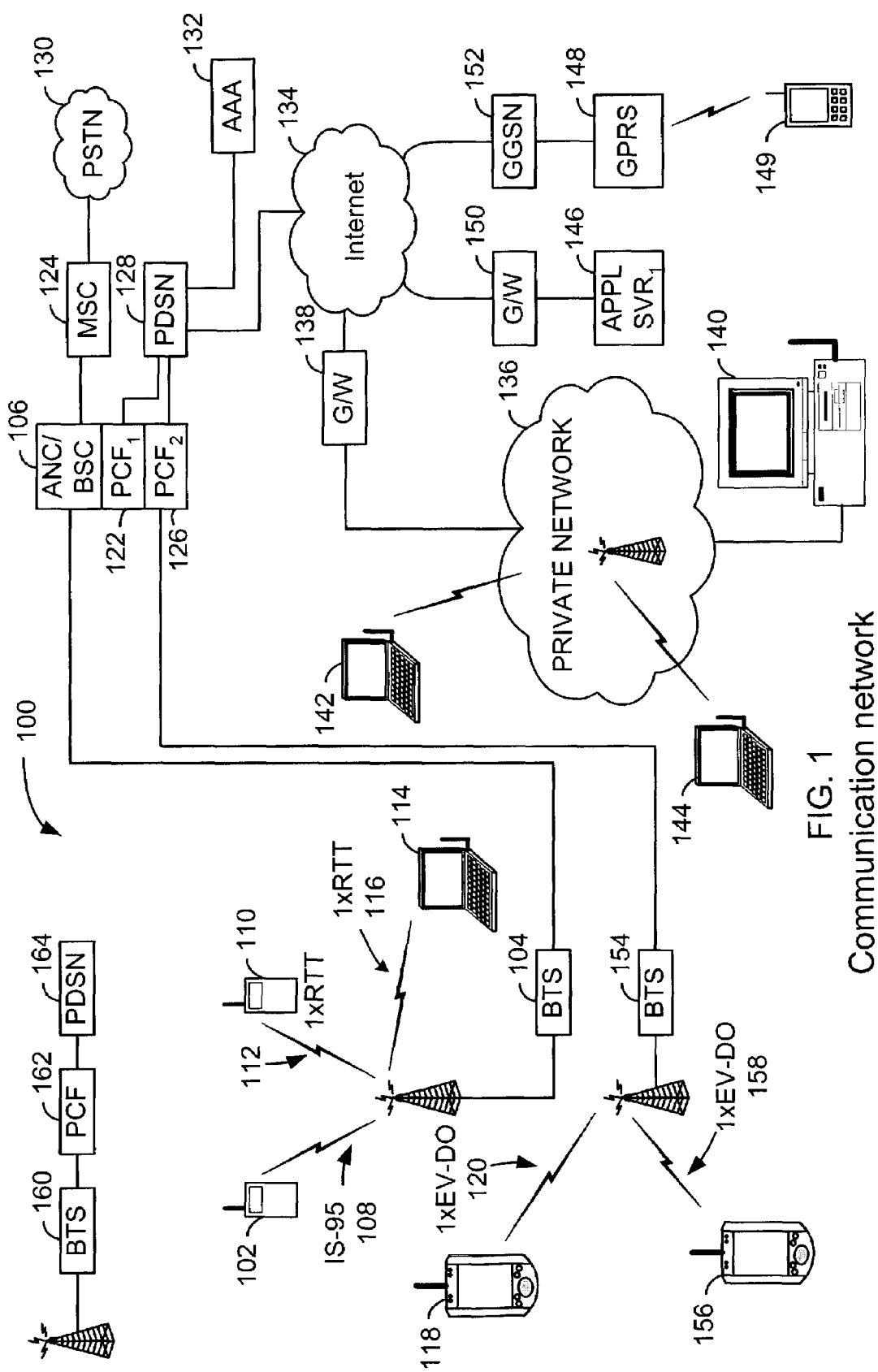
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. Existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to an Access Network Controller (ANC)/Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under CDMA2000 1×RTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call (data session) according to 1×RTT protocols over a wireless communication link shown generally at 116. Finally, an access terminal 118 is engaged in a data session over a wireless communication link, shown generally at 120, according to 1×EV-DO protocols in a so called "simple-IP" or "mobile-IP" network, as those terms are understood by one of average skill in the art. In general, simple-IP and mobile-IP networks do not include control-signaling protocols that are as extensive as some existing systems. In particular, simple-IP and mobile-IP networks do not include a "heartbeat" mechanism used to determine that a wireless terminal is present and operational.

Continuing to examine FIG. 1, BTS 104 is generally coupled to communicate with ANC/BSC 106 (or with packet control function cards there within). As is understood by one of average skill in the art, access network controllers and base station controllers have similar functionality. Moreover, Packet Control Function (PCF) cards can be installed either within a BSC or within an ANC according to whether the PCF is to communicate with a 1×RTT device or a 1×EV-DO device, respectively. It is to be understood that the BSC and ANC elements may readily be formed as stand alone units, but are shown herein as combined systems for illustration.

Within ANC/BSC 106, a plurality of different wireless network cards is included to facilitate communications with mobile stations and mobile terminals of differing protocols and types. For example, in the described embodiment, ANC/BSC 106 includes circuitry to communicate with mobile station 102 over IS-95 CDMA wireless communication network link as shown generally at 108. ANC/BSC 106 further includes a PCF 122 for communicating with mobile terminals 110 and 114 utilizing 1×RTT protocols. As maybe seen, PCF 122, which is for communicating with 1×RTT protocol devices, is coupled to a Mobile Switching Center (MSC) 124. A PCF 126, however, is for communicating with 1×EV-DO devices and thus it is coupled directly to a Packet Data Serving Node (PDSN) 128. Thus, access terminal 118 that communicates over wireless communication link 120 according to 1×EV-DO communication protocols, communicates with BTS 154 and with PCF 126 formed within ANC/BSC 106. It is understood, of course, that PCF 126 may readily be formed as a distinct device rather than within a rack of ANC/BSC 106. Moreover, PCF 126 may communicate with access terminal 118 through distinct radio equipment and, thus, through a BTS other than BTS 154 as shown herein.

MSC 124 further is coupled to a Public Switched Telephone Network (PSTN) 130. Accordingly, calls routed through MSC 124 are directed either to other MSCs (not shown herein) or to external networks by way of PSTN 130. The reference to PSTN herein includes SS7 and other similar "intelligent networks". 1×RTT data and 1×EV-DO calls, which are processed by PCF 126, however, are forwarded through PDSN 128, which, upon authentication by an Authentication, Authorization and Accounting (AAA) server 132, is connected to a data packet network, which, in this example, comprises Internet 134. As may further be seen, Internet 134 is coupled to a private network 136 by way of a gateway device 138. Private network 136 further is coupled through traditional wire line networks to a user terminal 140. Private network 136 is further coupled to mobile terminals 142 and 144 through a wireless network. In one embodiment, private network 136 comprises a wireless local area network and terminals 142 and 144 comprise wireless LAN terminals.

Internet 134 further is coupled to application server 146 by way of gateway device 150. A Global System for Mobile Communications (GSM) mobile terminal 149 is coupled to Internet 134 by way of a General Packet Radio Service (GPRS) network 148. GPRS 148 represents the GPRS architecture such as base station controller, mobile switching center, and serving support nodes. Gateway GPRS Support Node (GGSN) 152 is the interface between Internet 134 and GPRS 148.

Continuing to refer to FIG. 1, ANC/BSC 106 further is coupled to BTS 154, which is in communication with an access terminal 156 by way of a 1×EV-DO communication link 158. As may be seen, access terminal 156 is served by PCF 126, as is access terminal 118. Additionally, a BTS 160 is coupled to a PCF 162 that, in turn, is coupled to communicate with a PDSN 164. Thus, a mobile station, such as mobile station 102, may communicate with BTS 160, BTS 104, or both. PCF 162, as may be seen, is a standalone system rather than being integrated as a card in an ANC or a BSC.

As will be described in greater detail below, any one of the mobile terminals or access terminals may communicate with a device by way of Internet 134 through a home agent (HA) or a foreign agent (FA) depending on the Internet access point. In the described embodiment, the mobile terminal that is not within the service area of the HA will register with the HA through the FA. The FA accesses network profile information and routes data packets according to the data packet destination address and/or the application type. Data packets not destined for the home network will be routed through Internet access points thereby reducing the amount of data packets transported by the home network infrastructure according to profile information, policy information, and/or according to a destination address. Accordingly, network resources are not unnecessarily used and efficiency is improved.

Figure 2:
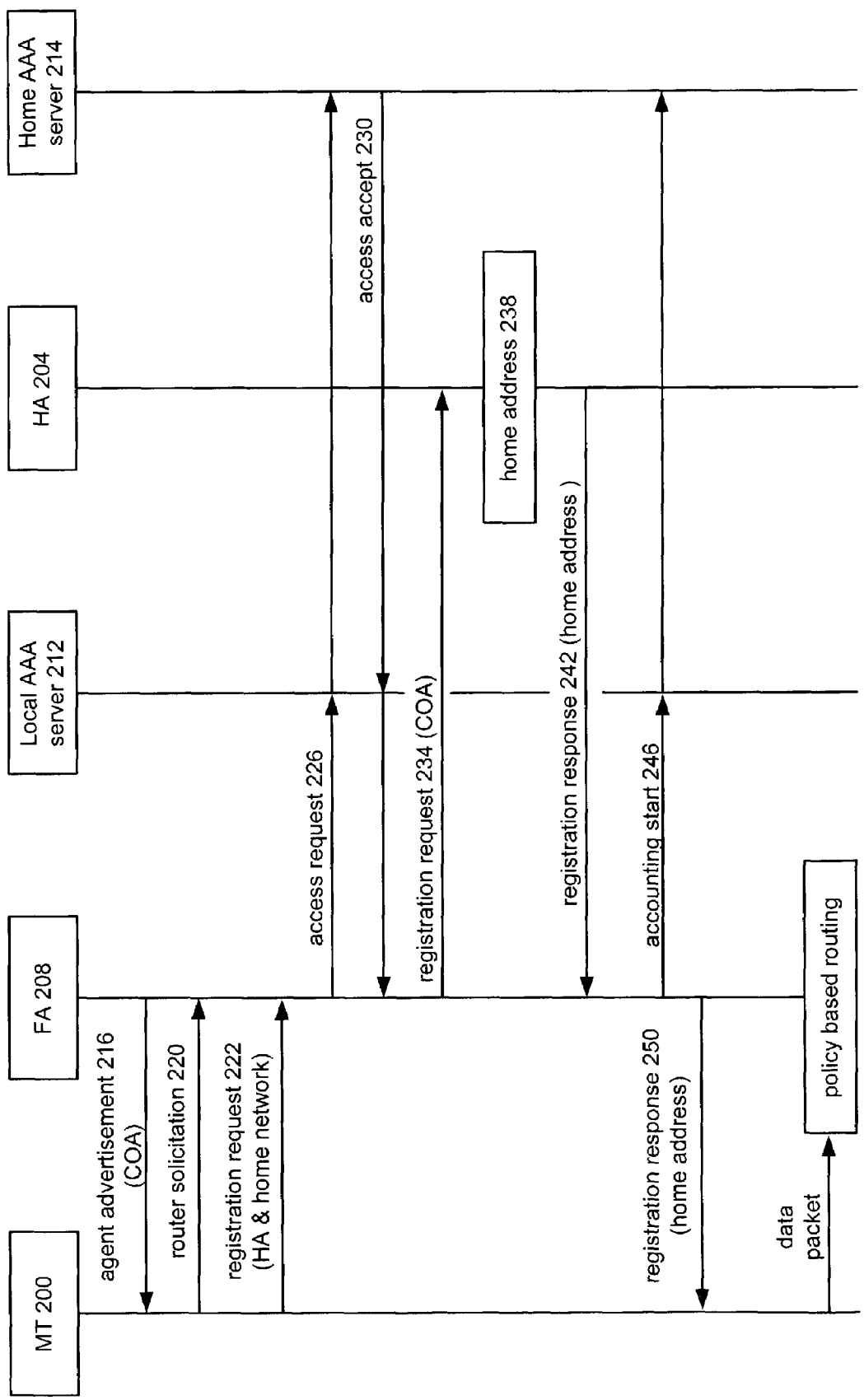
FIG. 2 is a signal sequence diagram that illustrates mobile terminal registration according to one embodiment of the present invention.

FIG. 2 is a signal sequence diagram that illustrates mobile terminal registration according to the present invention. As mobile terminal (MT) 200 moves from its home network a home agent (HA) 204 must update the location of the mobile terminal in a home list. HA 204 is a specially designated server that is responsible for receiving and forwarding data packets to the mobile terminal. Any HA serving a visiting mobile terminal is considered a foreign agent (FA).

As the mobile terminal moves into a foreign network, it must register its location with its HA. The mobile terminal may use an FA, such as FA 208, to assist with this registration, if such an FA is present in the network. In order to obtain profile and other information for a mobile terminal, an HA, such as FA 208, will communicate with a local Authentication, Authorization, and Accounting (AAA) server 212 or with a home AAA server 214. To establish a communication link with MT 200, FA 208 will periodically send out an agent advertisement 216 containing a care-of address. The agent advertisement is a special IP packet periodically broadcast by home agents and foreign agents to notify mobile terminals of their location and that they are available for connectivity. The care-of address is the IP address of FA 208. In the event MT 200 does not receive agent advertisement 216, it will send router solicitation 220. Router solicitation 220 is a message sent by the mobile terminal to discover a foreign agent in order to obtain the care-of address. Upon the reception of either agent advertisement 216 or router solicitation 220, MT 200 must register with its HA. MT 200 will send registration request 222 containing its HA and home network information. Registration request is a message to inform the HA of the mobile terminal location (care-of address) so that data packets can be correctly forwarded to the mobile terminal.

FA 208 will, upon receiving the registration request, send access request 226 containing the mobile terminal identification to local AAA server 208. Access request is a means for identifying the mobile terminal and to establish accounting for services used. Local AAA server 208 is a specialized server that verifies MT 200 authentication. Local AAA server 208 will forward access request 226 to home AAA server 214 which will respond with access accept 230 for an authenticated mobile terminal to indicate the mobile terminal is authorized to access the Internet. Once authentication has been received, FA 208 sends registration request 234, containing the care-of address, to HA 204 which stores the care-of address in the MT 200 profile. When HA 204 receives a data packet addressed to MT 200, HA 204 will encapsulate the data packet with the care-of address and forward the encapsulated data packet to FA 208.

HA 204 returns a home address 238 with registration response 242. In general, registration response 242 is a reply from the HA to the mobile terminal used to complete the registration process. If MT 200 is assigned a static IP address, HA 204 returns the static IP address as the home address. For a dynamic addressing, HA 204 will assign an IP address and return the IP address as the home address with registration response 242. FA 208 sends accounting start 246 then sends registration response 250 to MT 200. MT 200 is now registered and can access the home network or any other data packet network.

In one embodiment of the invention, FA 208 further receives subscription/profile information 254 originated by the home AAA server 214 as a part of or subsequent to the registration process. Accordingly, FA 208, as will be described in greater detail below, performs policy based routing of outgoing data packets originated by MT 200 according to the type of communication in one embodiment and according to a destination address in another embodiment of the present invention.

Figure 3:
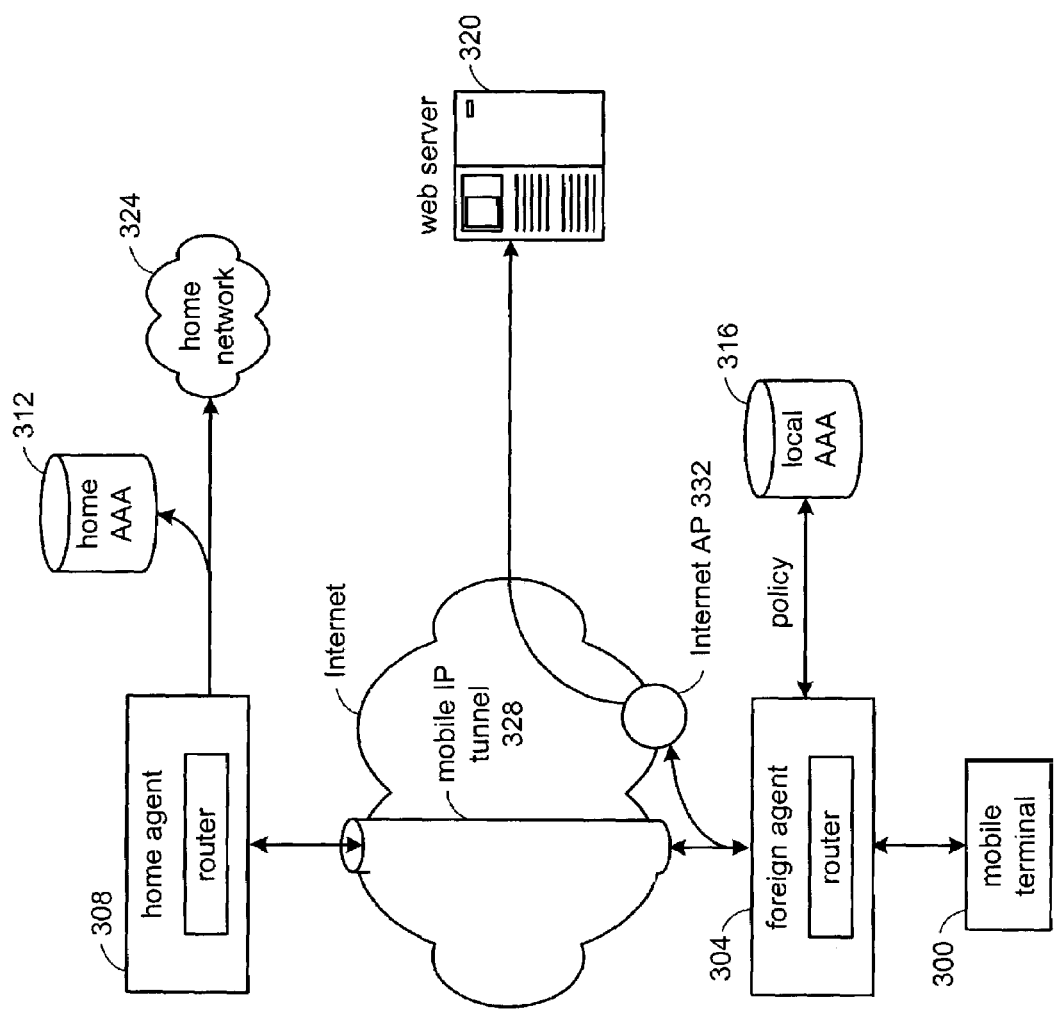
FIG. 3 is a functional block diagram that illustrates policy based data packet routing according to one embodiment of the present invention.

FIG. 3 is a functional block diagram that illustrates policy based data packet routing according to one embodiment of the present invention. Mobile terminal 300 has registered with foreign agent 304 and home agent 308. During or subsequent to the registration process, foreign agent 304 receives policy based routing information from home authentication, authorization and accounting (AAA) server 312 via local AAA server 316. When mobile terminal 300 attempts to access a data packet network, such as home network 324 or web server 320, foreign agent 304 will access the routing policy received via local AAA server 316 and route the data packets accordingly.

The routing policy can be based upon one of a network policy and a subscriber policy. The network policy can specify routing data packets according to an address specified by the mobile terminal or based on an application type associated with the data packet. The application type includes home network 324 applications such as e-mail, file sharing, and establishing a session initiation protocol (SIP) for video conferencing and telephony over IP-based networks. If the application type is of a type specified for home network 324, foreign agent 304 will encapsulate the data packet creating mobile IP tunnel 328 for routing the data packet to home agent 308 for forwarding to home network 324. The data packet will be routed to Internet access point (AP) 332 if the application type is not of a type specified by the network policy. The network policy may also specify routing based on a destination address such as the address of a network node in home network 324 or an address served by web server 320.

Home AAA server 312 may also specify subscriber profile based routing policy. Information stored in home AAA server 312 will be accessed by foreign agent 304 during registration via local AAA server 316. Foreign agent 304 will use the information received via local AAA server 316 when mobile terminal 300 accesses a data packet network. Foreign agent 304 will apply the subscriber profile for mobile terminal 300 to route the data packet according to one of a destination address or a specified application type.

By using policy based routing according to one embodiment of the present invention, the home network operator is able to reduce network cost by reducing the amount of traffic that must be backhauled to the home network. Each data packet is examined for application type and/or destination address and routed accordingly. Data packets with applications or addresses within the home network are routed through the mobile IP tunnel while all other traffic is routed to an Internet AP. The home network operator is able to carry only selected network traffic on the home network while still providing universal connectivity and service.

Figure 4:
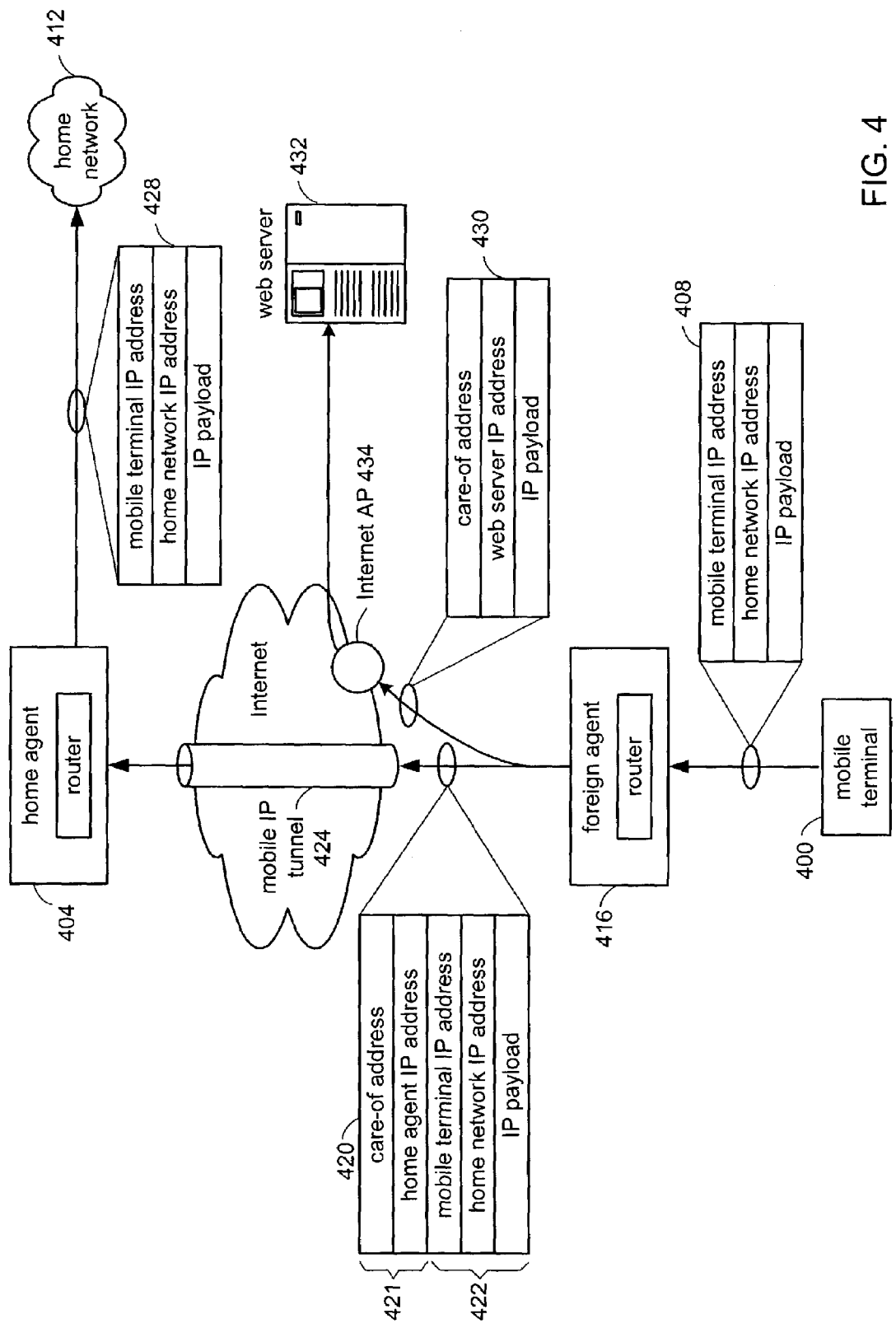
FIG. 4 illustrates foreign agent to home agent encapsulation according to one embodiment of the present invention.

FIG. 4 illustrates foreign agent data packet encapsulation for a network operating according to one embodiment of the present invention. After mobile terminal 400 has registered with home agent 404, it sends data packet 408 containing a header that includes a destination address, a source address, a data payload, and other data fields (not shown) containing control information. As shown in FIG. 4, data packet 408 contains the mobile terminal IP address as the source address and a home network IP address as the destination address. Foreign agent 416, upon receiving the data packet, encapsulates the original data packet header 422 with a new header 421 containing the care-of address as the source address and the IP address of home agent 404 as the destination address. This new data packet is illustrated by data packet 420. Mobile IP tunnel 424 is now established with foreign agent 416 as the tunnel source and home agent 404 as the tunnel destination.

When home agent 404 receives the encapsulated data packet it strips off the encapsulation, generating data packet 428, which is the original data packet 408. Data packet 428 is then delivered to the destination address within home network 412.

According to one embodiment of the present invention, FA 416 routes data packets according to a routing policy. When foreign agent 416 receives data packets from mobile terminal 400, it determines whether to route the data packets to home agent 404 or to web server 432 based on the routing policy. Data packets that are to be routed to web server 432 do not need encapsulation and are routed to Internet access point (AP) 434 for delivery to web server 432. Data packet 430 comprises a header containing the mobile terminal care-of address as the source address and the web server IP address as the destination address.

The encapsulation process has built-in inefficiencies when the destination address is not within home network 412 in prior art networks. For example, assume the destination address is a web server on the Internet. Foreign agent 416 will route the data packet to home agent 404 which will then strip the encapsulation and route the data packet to the Internet. Return data packets from the web server are routed to home agent 404 which in turn must encapsulate the data packets and forward them to foreign agent 416. In this scenario, all data packets sent by mobile terminal 400 must transverse mobile IP tunnel 424 to home agent 404 even if the destination address is not within home network 412. The network provider must support network traffic not destined for its own network and thus incur the expense of provisioning transmission equipment to carry the traffic. One of average skill in the art will recognize that the policy based routing according to the embodiments of the present invention overcomes the problems associated with backhauling all traffic through the mobile IP tunnel.

Figure 5:
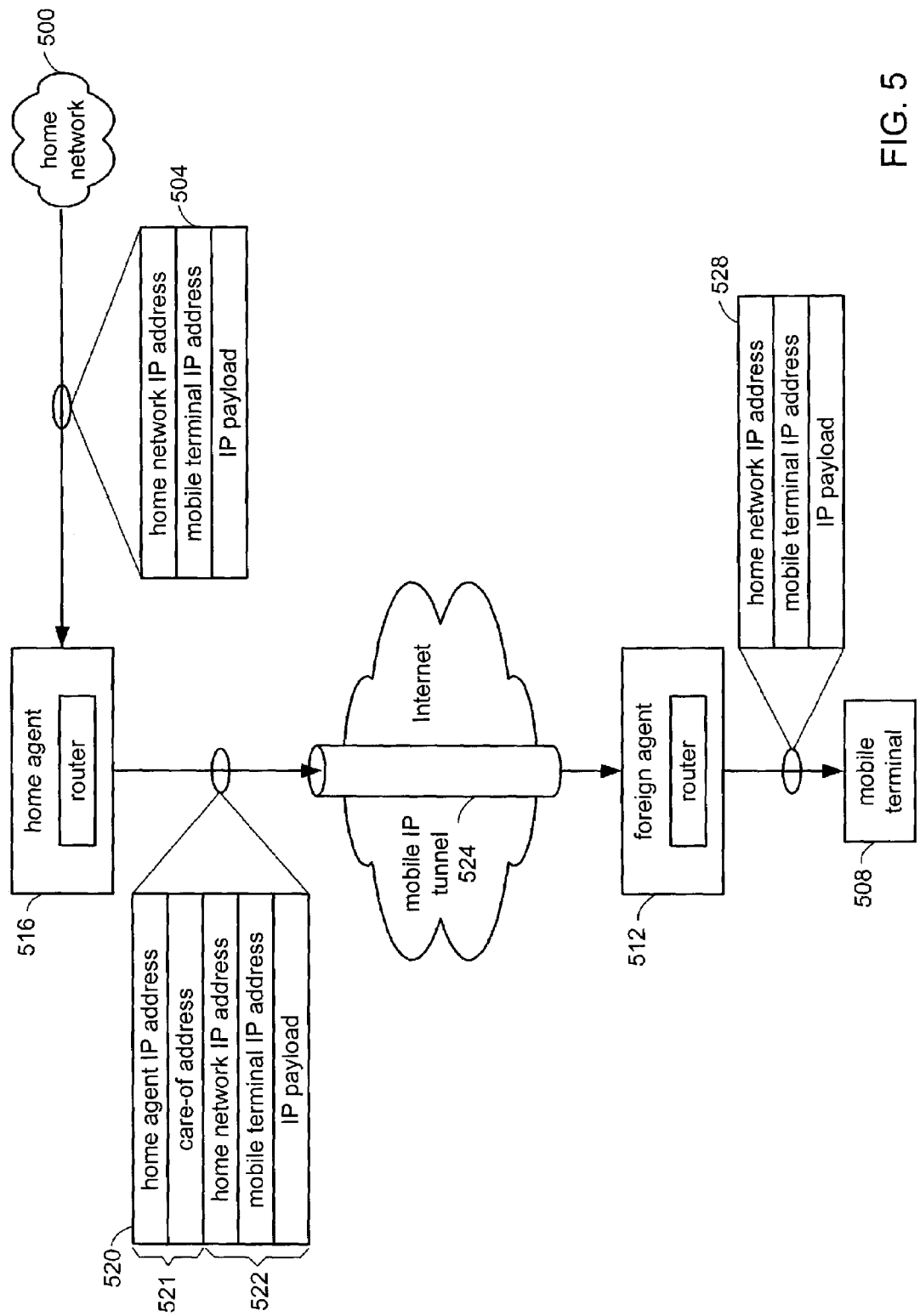
FIG. 5 illustrates home agent to foreign agent encapsulation according to one embodiment of the present invention.

FIG. 5 illustrates home agent data packet encapsulation. Encapsulation is the process of enclosing an original data packet with header and IP address inside a new header and new IP address. When home network 500 sends data packet 504 to mobile terminal, it does not know that mobile terminal 508 is now registered with foreign agent 512. Home agent 516 maintains a home list that identifies the mobile terminals it serves. Each entry in the list includes the current location of each mobile terminal. Home agent 516 will update its home list to include the care-of address received when mobile terminal 508 registers with foreign agent 512.

Home agent 516 receives data packet 504 that contains a header including a source address, a destination address, and other data fields (not shown). Home agent 516 encapsulates original header 522 with a new header 521 containing the care-of address and the home agent IP address. Data packet 520 now contains the care-of address as the destination address and home agent IP address as the source address thereby creating mobile IP tunnel 524. Data packet 520 is delivered to foreign agent 512 where the new header is removed to reveal the original destination address of mobile terminal 508. Foreign agent 512 then routes data packet 528 to mobile terminal 508.

Figure 6:
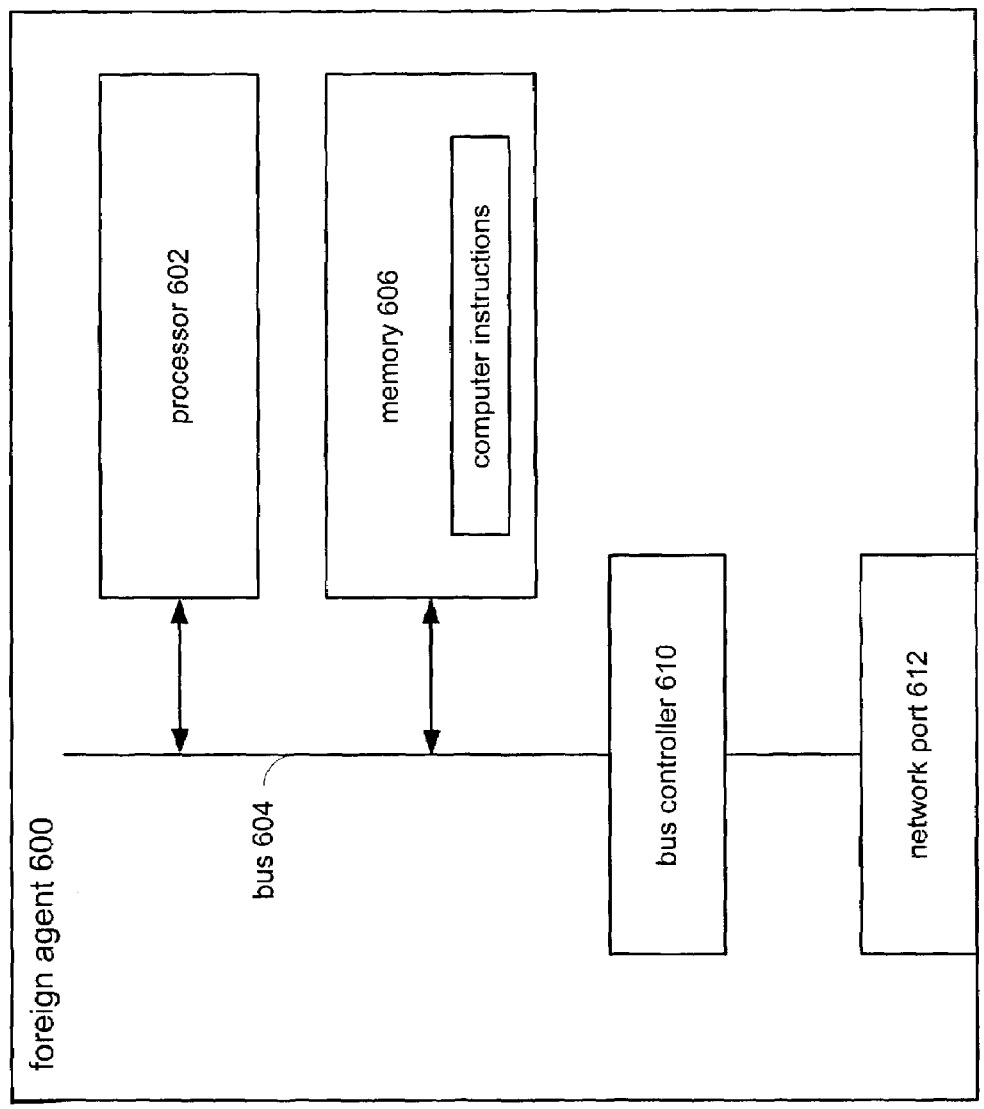
FIG. 6 is a functional block diagram of a foreign agent that illustrates one embodiment of the present invention.

FIG. 6 is a functional block diagram of a foreign agent that illustrates one embodiment of the present invention. Foreign agent 600 includes a processor 602 that is coupled to communicate over a bus 604. A memory 606 further is coupled to bus 604 and is for storing computer instructions that define the operational logic of foreign agent 600. Bus 604 further is coupled to a bus controller 610, which controls the communications and timing of communications thereon. Bus controller 610 is further coupled to a network port 612 that enables foreign agent 600 to communicate with a mobile IP network.

In operation, processor 602 communicates with memory 606 by way of bus 604 to retrieve computer instructions stored therein and to execute the computer instructions to operate according to the logic defined within the computer instructions of memory 606. Memory 606 specifically includes computer instructions that define the logic for performing registration of a mobile terminal. Additionally, computer instructions stored in memory 606 define logic for routing data packets according to a routing policy received during the mobile terminal registration process and stored in memory 606.

Thus, for example, when foreign agent 600 receives a data packet from the mobile terminal, computer instructions stored in memory 606 define logic that encapsulates the data packet according to destination address and/or application type as defined by the routing policy. The mobile terminal can be, due to mobile IP protocol, one of a general packet radio service (GPRS), a 1×EV-DO terminal, a 1×EV-DV, and a 1×RTT terminal.

Figure 7:
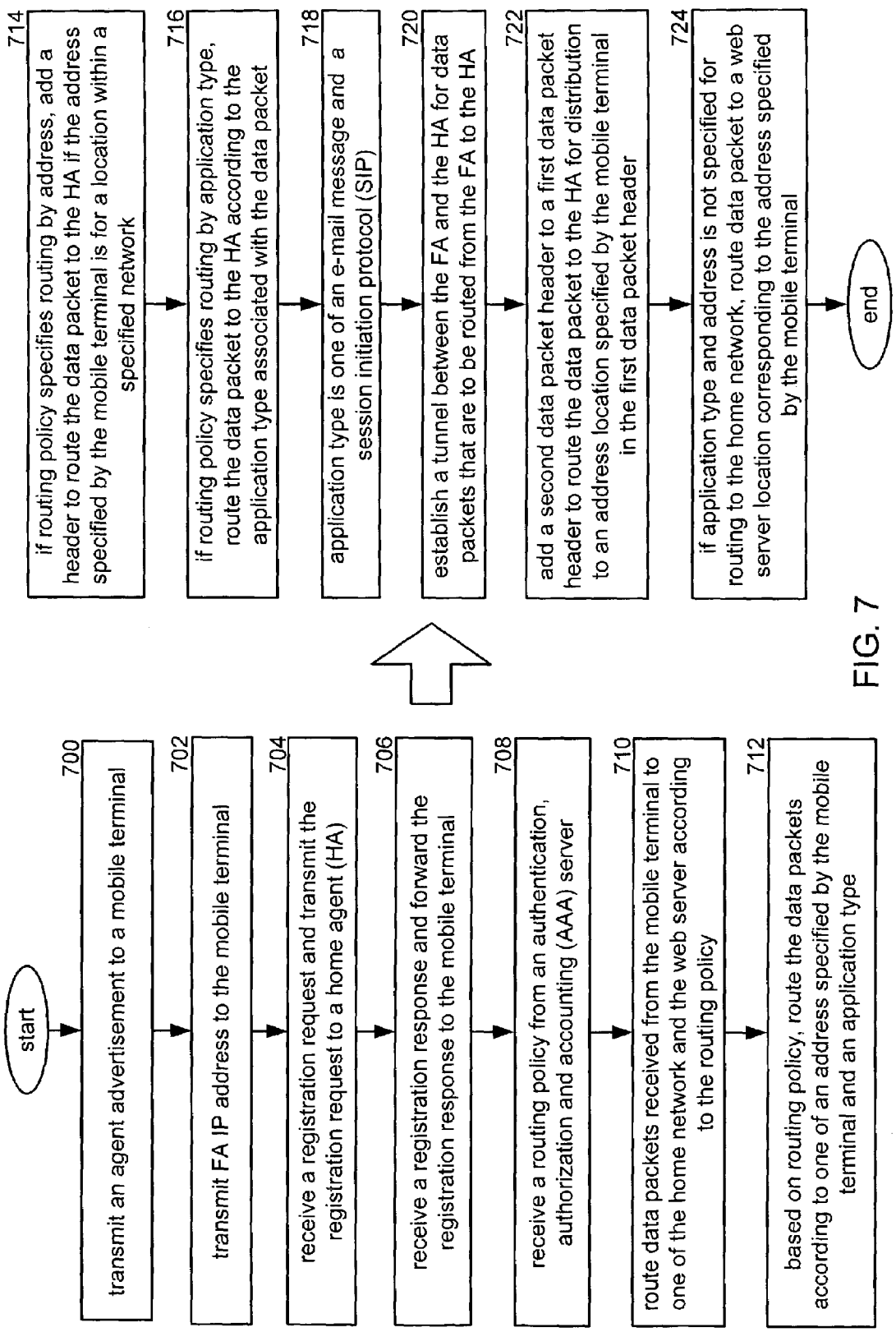
FIG. 7 is a flowchart illustrating one method of the present invention.

FIG. 7 is a method flow chart of one embodiment of the present invention. The foreign agent transmits an agent advertisement to a mobile terminal (step 700) to announce the FA is available to service visiting mobile terminals. During the agent advertisement, the FA transmits its IP address to the mobile terminal (step 702). The FA IP address is used as a care-of address for routing purposes. The FA receives a registration request from the mobile terminal and transmits the registration request to a home agent (step 704) specified in the registration request. The FA receives a registration response from the HA and forwards the registration response to the mobile terminal (step 706). The FA receives the registration response from the HA and reformats the registration response with new headers required before forwarding the registration response to the mobile terminal. The forwarded registration response contains, therefore, information that is similar to but not identical to the registration request.

In the process of registration, the FA receives a routing policy from an authentication, authorization, and accounting (AAA) server (step 708). The FA receives the routing policy information from a HA home AAA server via local AAA server. When a data packet is received from the mobile terminal, the FA routes the data packets to one of a home network and a web server according to the routing policy (step 710) received via the local AAA server. The FA will route data packets according to one of an address specified by the mobile terminal and an application type as defined in the routing policy (step 712). If the routing policy specifies routing by address, the FA will add a header to route the data packet to the HA if the address specified by the remote terminal is for a location within a specified network (step 714). The specified network usually, but not always, lies within an address range defining the home network.

Routing policy may also specify routing by application type. If the routing policy specifies routing by application type, the FA routes the data packet to the HA according to the application type associated with the data packet (step 716). The application type includes one of an e-mail message and a session initiation protocol (SIP) (step 718). When routing data packets from the FA to the HA, the FA establishes a tunnel between the FA and the HA (step 720) by adding a second data packet header to a first data packet header in order to route the data packet to the HA for distribution to an address location specified by the mobile terminal in the first data packet header (step 722).

If the mobile terminal application type and address is not specified for routing to the home network, the FA routes the data packet to a web server location corresponding to the address specified by the mobile terminal (step 724). This policy based routing reduces traffic on the mobile IP tunnel by diverting traffic not specifically destined for the home network to an alternate Internet access point.

Figure 8:
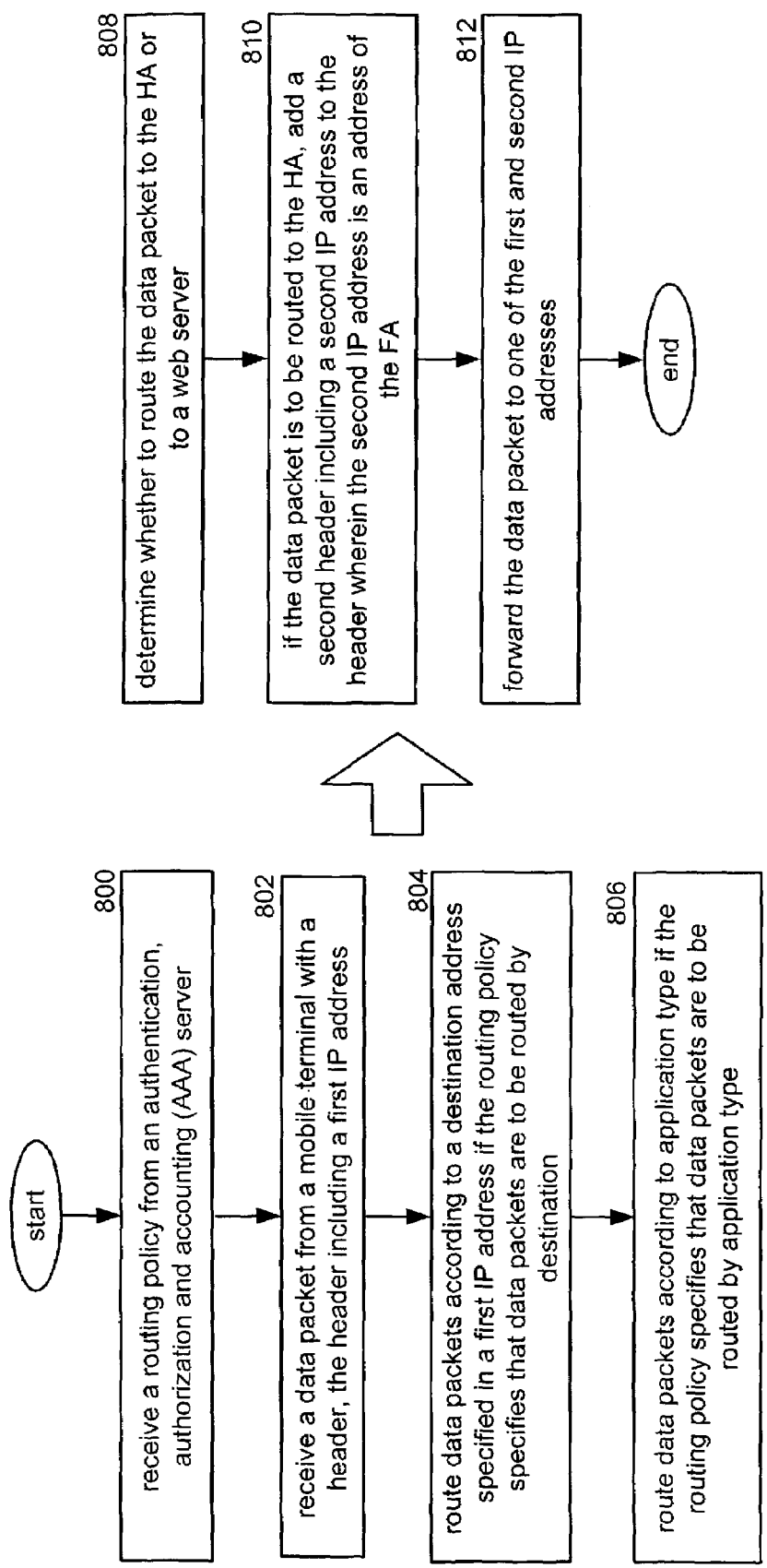
FIG. 8 is a flowchart illustrating one method of the present invention.

FIG. 8 is a flow chart of one embodiment of the present invention. A foreign agent receives a routing policy from an authentication, authorization, and accounting (AAA) server during registration (step 800). After registration, the FA receives a data packet from a mobile terminal with a header containing a first IP address (step 802). A routing policy is defined in the mobile terminal home AAA server and is received by the FA via a local AAA server during registration. The FA will route data packets according to the routing policy defined by the AAA server. The FA will route data packets according to application type if the routing policy specifies that data packets are to be routed by application type (step 804). Application types include e-mail and video conferencing and Internet telephony as defined by a session initiation protocol (SIP). Data packets can also be routed by destination address if the routing policy so specifies (step 806). The destination address will be within an IP address range that defines a specified network usually within the mobile terminal home network. Based on the routing policy, the FA determines whether to route the data packet to the HA or to a web server (step 808). Using policy based routing, the traffic load on a HA mobile IP tunnel is reduced by directing traffic intended for the web server to an Internet access point. Home network costs are reduced since transmission equipment does not have to be provisioned for traffic not specifically destined for the home network.

If the FA determines the data packet is to be routed to the HA, it adds a second header including a second IP address to the header wherein the second IP address is an address of the FA (step 810). The FA then forwards the data packet to one of the first and second IP addresses (step 812).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A foreign agent (FA) for serving a mobile terminal having a defined home agent (HA), comprising:
   a processor for executing computer instructions that define operational logic of the FA;
   a bus coupled to the processor for transmitting computer instructions and control signals to and from the processor within the FA;
   a bus controller for controlling communications and timing of communications thereon;
   a network port for coupling the FA to a wireless communication network to enable the FA to communicate with the mobile terminal, the defined HA and a web server;
   memory coupled to the bus, the memory including the computer instructions that define operational logic for routing data packets between the mobile terminal, the defined HA and a web server;
   the memory further including computer instructions that define logic for communicating with an authentication, authorization and accounting (AAA) server to receive routing policy information;
   the memory further including computer instructions that define logic for creating a tunnel between the FA and the HA; and
   wherein the FA determines whether to route data packets originating from the mobile terminal to the HA or to the web server based upon the routing policy information.

2. The FA of claim 1 wherein the routing policy received from the AAA server is specific to the mobile terminal and includes subscriber profile information defining routing policies for the mobile terminal.

3. The FA of claim 1 wherein the routing policy received from the AAA server is a network policy defining routing according to application type.

4. The FA of claim 1 wherein the FA routes data packets of a specified application type directly to the web server.

5. The FA of claim 1 wherein the FA routes data packets of a specified application type directly to the HA.

6. The FA of claim 1 wherein the FA determines whether to route data packets either to the HA or to the web server according to a destination address.

7. The FA of claim 1 wherein the mobile terminal is one of a general radio packet services terminal (GPRS), a 1×EV-DO terminal, a 1×EV-DV terminal, a 1×RTT terminal, and a wireless local area network terminal.

8. A method in a foreign agent (FA) of a mobile IP network for routing data packets between a mobile terminal, a web server and a home agent (HA), comprising:
   transmitting an agent advertisement to the mobile terminal;
   transmitting an address of the FA to the mobile terminal;
   receiving a registration request and transmitting the registration request to the HA;
   receiving a registration response and forwarding the registration response to the mobile terminal;
   receiving a routing policy from an authentication, authorization and accounting (AAA) server; and routing data packets received from the mobile terminal to one of a home network and the web server according to the routing policy.

9. The method of claim 8 further including establishing a tunnel between the FA and the HA for data packets that are to be routed from the FA to the HA.

10. The method of claim 9 wherein establishing the tunnel includes adding a second data packet header to a first data packet header to route the data packet to the HA for distribution to an address location specified by the mobile terminal in the first data packet header.

11. The method of claim 8 wherein the routing policy prompts the FA to route the data packet to the HA according to an address specified by the mobile terminal.

12. The method of claim 8 wherein the routing policy prompts the FA to route the data packet to the HA according to an application type associated with the data packet.

13. The method of claim 12 wherein the application type is an e-mail message.

14. The method of claim 12 wherein the application type is a session initiation protocol (SIP).

15. The method of claim 12 wherein the application type is not specified for routing to the home network and wherein the data packet is routed to a web server location corresponding to the address specified by the mobile terminal.

16. The method of claim 8 wherein the routing policy specifies routing by address wherein the FA will only add a header to route the data packet to the HA if the address specified by the mobile terminal is for a location within a specified network.

17. A method in a foreign agent (FA) of a mobile IP network for routing data packets between a mobile terminal, a web server and a home agent (HA), comprising:

receiving a data packet from the mobile terminal with a header, the header including a receiving a routing policy from an authentication, authorization and accounting (AAA) server first IP address;

determining whether to route the data packet to the HA or to the web server;

if the data packet is to be routed to the HA, adding a second header including a second IP address to the header wherein the second IP address is an address of the FA; and forwarding the data packet to one of the first and second IP addresses.

18. The method of claim 17 wherein the FA routes data packets according to application type if the routing policy specifies that data packets are to be routed by application type.

19. The method of claim 17 wherein the FA routes data packets according to a destination address specified in the first IP address if the routing policy specifies that data packets are to be routed by destination.

\* \* \* \* \*